Sept. 1, 1931.                R. F. STEWART                1,821,363
                          BUTTER CUTTING MACHINE
                           Filed June 19, 1928          5 Sheets-Sheet 1
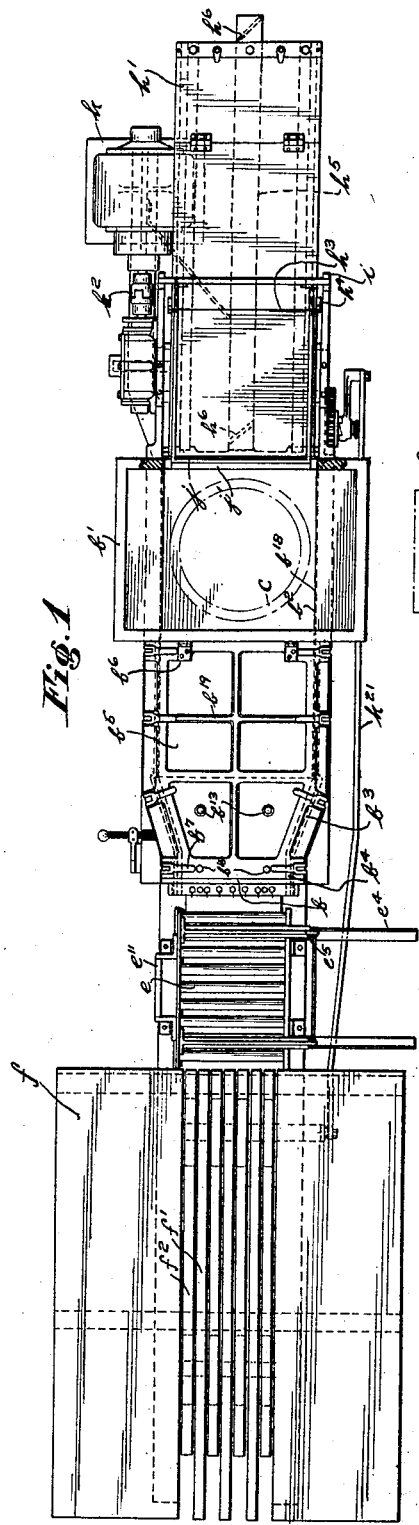
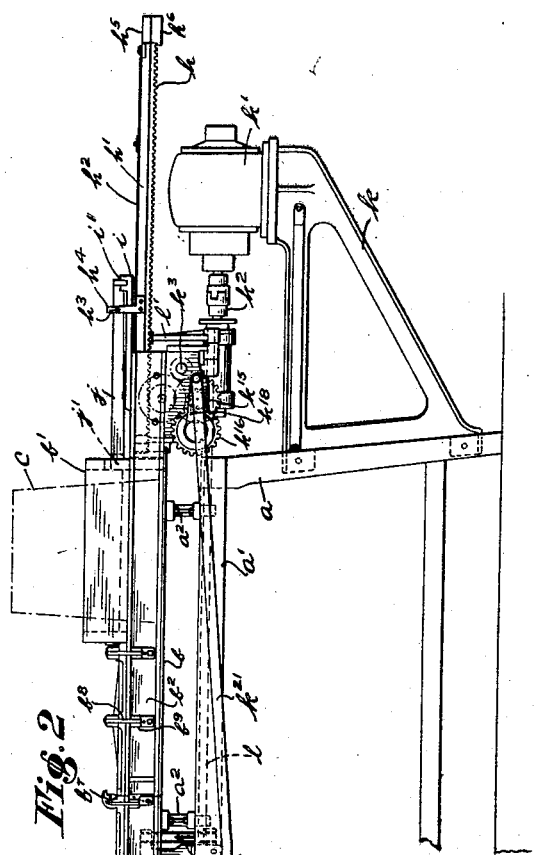
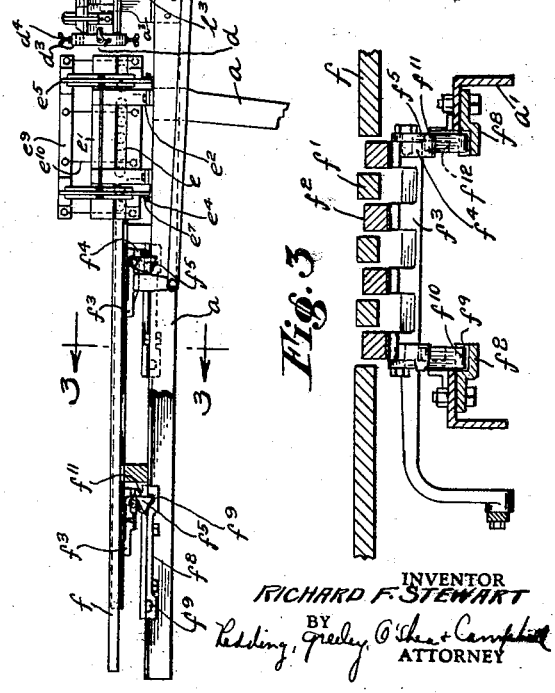
INVENTOR
RICHARD F. STEWART
BY
Redding, Greeley, O'Shea + Campbell
ATTORNEY Sept. 1, 1931. R. F. STEWART 1,821,363
BUTTER CUTTING MACHINE
Filed June 19, 1928 5 Sheets-Sheet 2

INVENTOR
RICHARD F. STEWART
BY
his ATTORNEYS

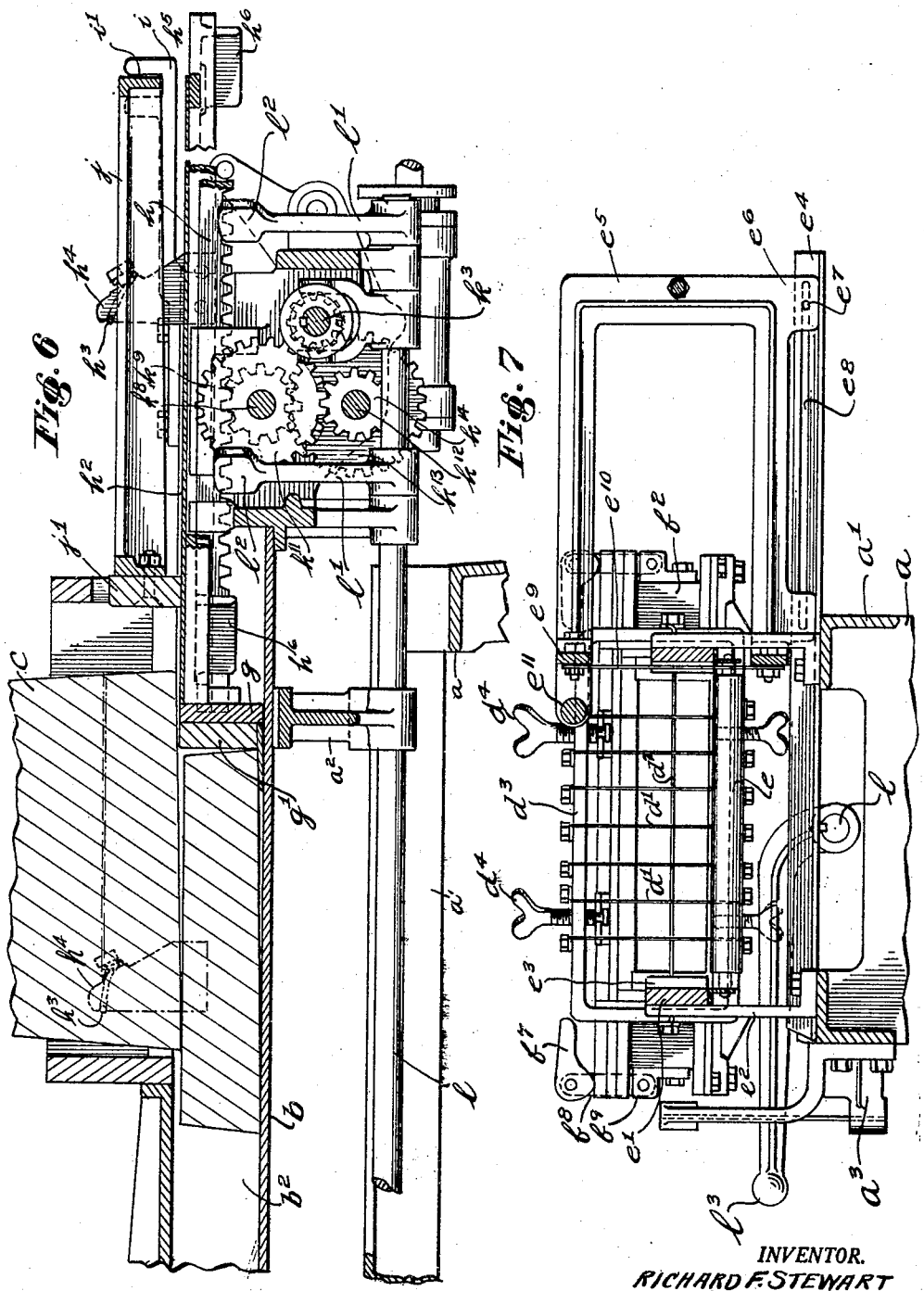

Sept. 1, 1931.  R. F. STEWART  1,821,363
BUTTER CUTTING MACHINE
Filed June 19, 1928   5 Sheets-Sheet 5
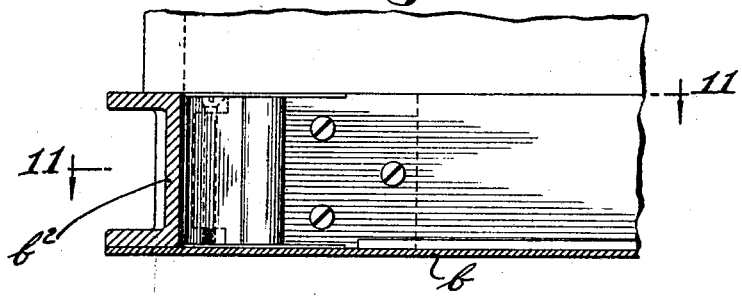
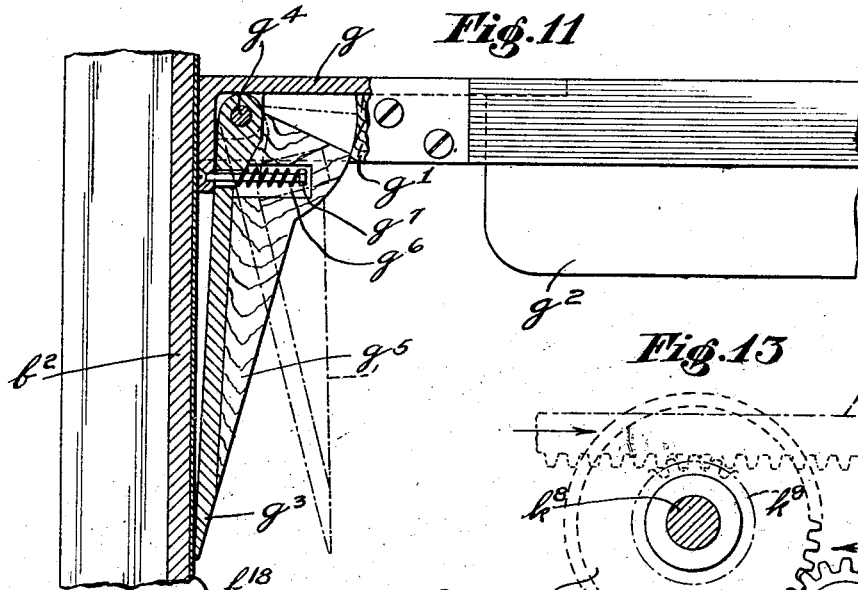
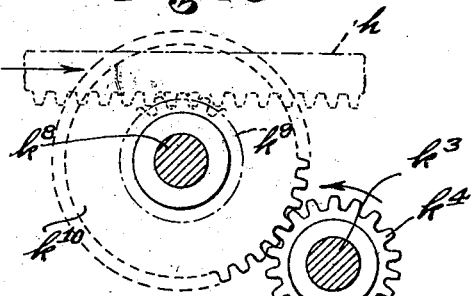
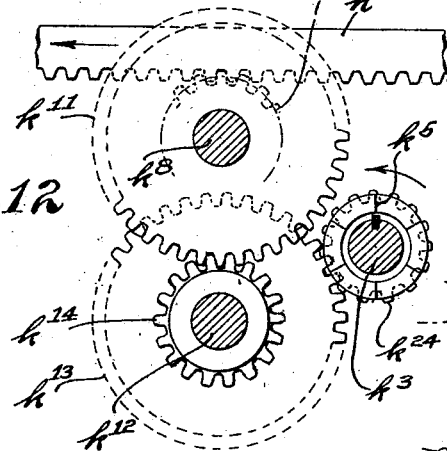
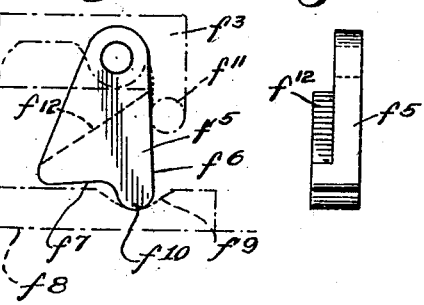
INVENTOR
RICHARD F. STEWART
BY
Redding, Greeley, O'Shea & Campbell
his ATTORNEYS Patented Sept. 1, 1931

1,821,363

UNITED STATES PATENT OFFICE

RICHARD F. STEWART, OF BRIARCLIFF MANOR, NEW YORK

BUTTER CUTTING MACHINE

Application filed June 19, 1928. Serial No. 286,503.

The present invention relates to machines for shaping and cutting plastic substances, such as butter, into blocks of desired size and quantity and particularly pertains to those machines which automatically and continuously perform the operation of shaping and cutting material of the above character which is fed into a suitable hopper at the receiving end of the machine. Where great quantities are to be cut and shaped from a larger mass, it is desirable that the machine for doing this be of a size and character capable of performing these functions rapidly and effectively.

An object of the invention is to provide a machine of the above character which is simple in operation and requires very little supervision. It is contemplated that, after once starting the machine, continued operation thereof takes place, requiring only the feeding of the bulk material and the removing of the shaped and cut prints.

A further object of the invention is to provide a cutting machine which handles the plastic material with no waste and confines such material to certain well defined and restricted paths of movement, thus preventing it from coming in contact with many portions of the machine. Further and other objects, such as improved delivery and cutting means, as well as means for varying the size of the cut blocks will be apparent as the detailed description of the invention proceeds and reference will now be had to the accompanying drawings, wherein:

Figure 1 is a plan view showing the cutting machine completely assembled.

Figure 2 is a view in side elevation, partly broken away and in section, showing the cutting machine of Figure 1.

Figure 3 is a view in section, taken on line 3—3 of Figure 2, and looking in the direction of the arrows.

Figure 6 is a view in section, partly broken away, and taken on line 6—6 of Figure 5, and looking in the direction of the arrows.

Figure 7 is a view in section, taken on line 7—7 of Figure 8, and looking in the direction of the arrows.

Figure 10 is a segmental view showing one end of the compressing plunger.

Figure 11 is a view in section, taken on line 11—11 of Figure 10, and looking in the direction of the arrows.

Figure 12 is a view in section, taken on line 12—12 of Figure 4, and looking in the direction of the arrows.

Figure 13 is a view in section, taken on line 13—13 of Figure 4, and looking in the direction of the arrows.

Figure 14 is a view in side elevation showing one of the pivoted dogs upon which the reciprocating delivery bed rides.

Figure 15 is a side elevation of the dog shown in Figure 14.

Figure 4:
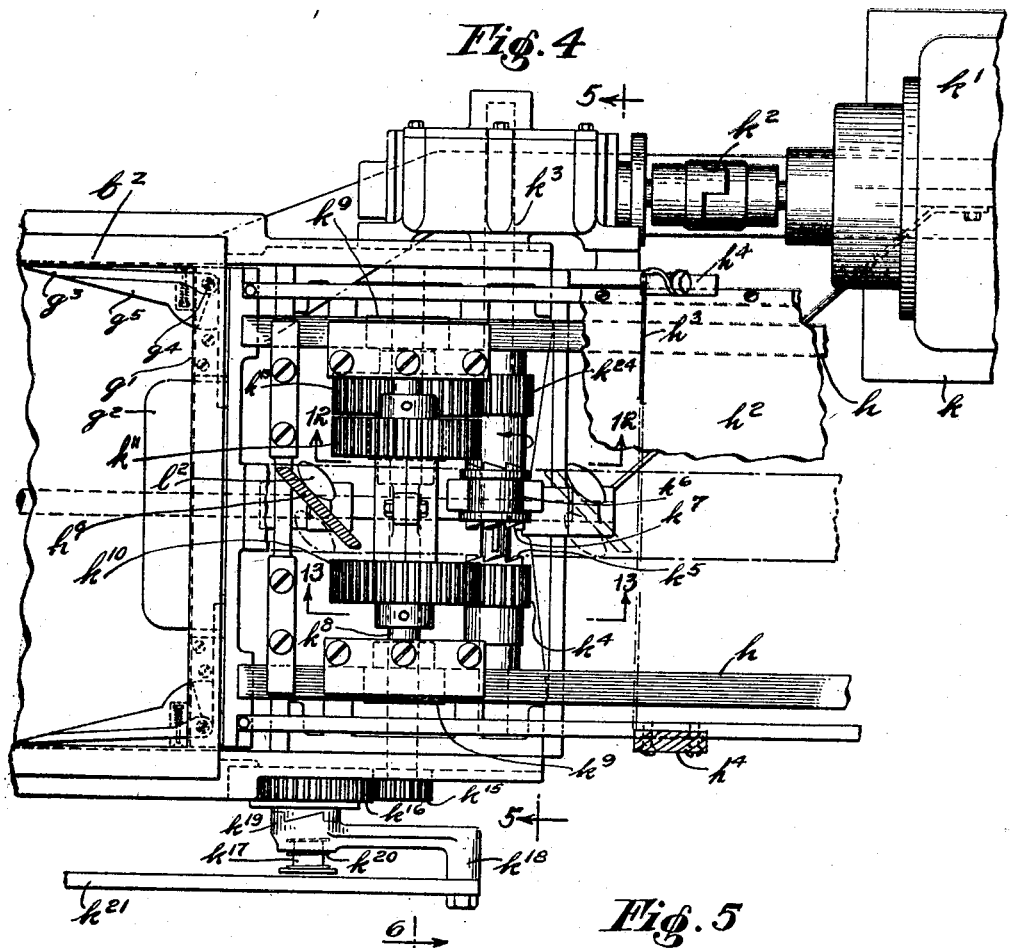
Figure 4 is a plan view, partly broken away and enlarged, showing the driving means.
Figure 5:
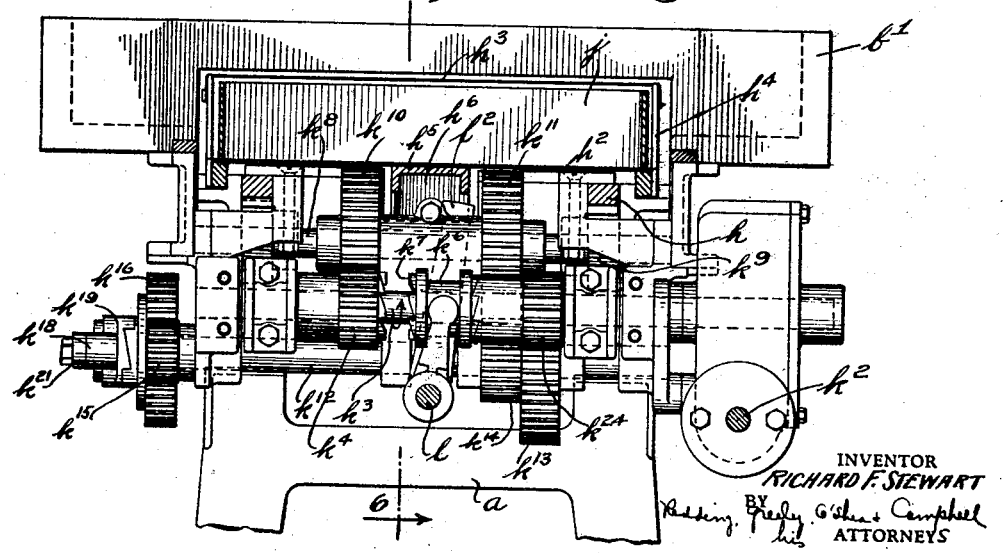
Figure 5 is a view in section, taken on line 5—5 of Figure 4, and looking in the direction of the arrows.
Figure 8:
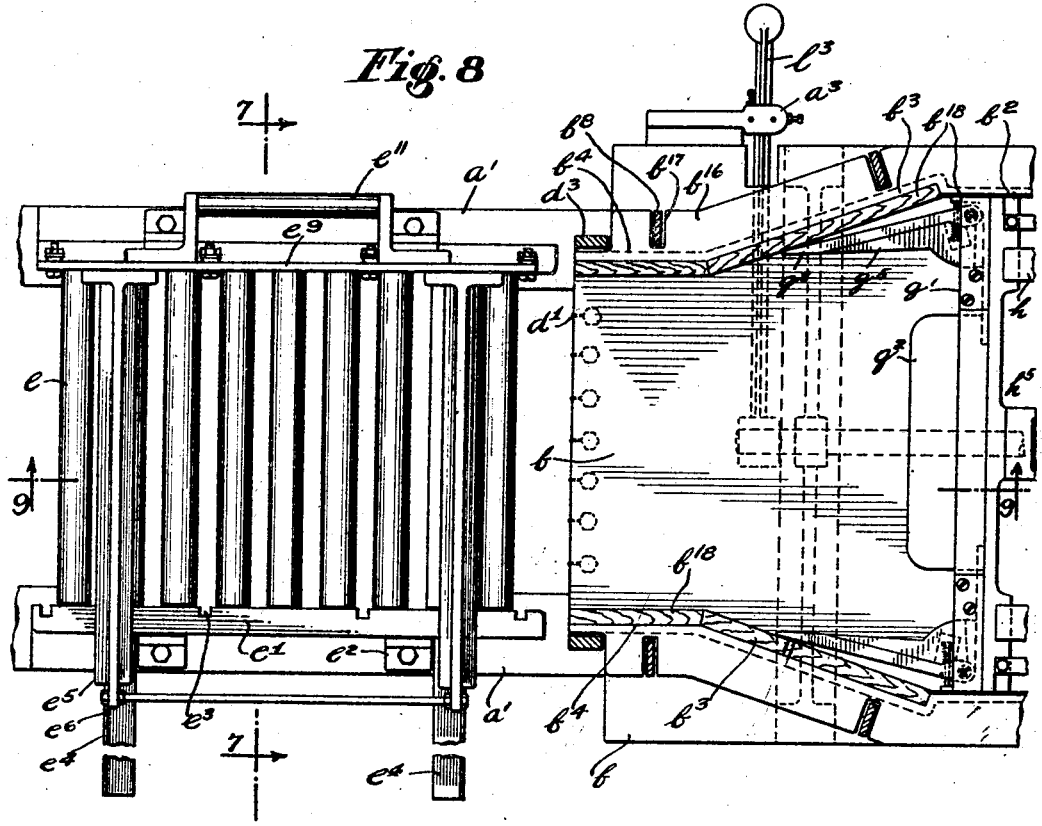
Figure 8 is a plan view, enlarged and partly broken away, showing the means for cutting the material into blocks of desired sizes.
Figure 9:
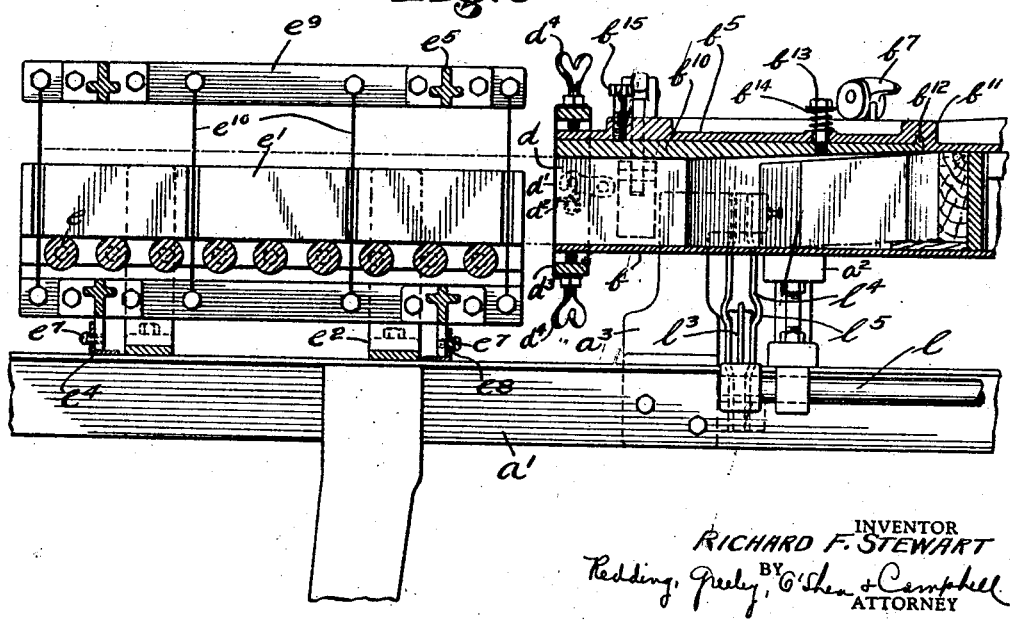
Figure 9 is a view in section, taken on line 9—9 of Figure 8, and looking in the direction of the arrows.

Referring to the above drawings, $a$ designates the frame of a machine provided with longitudinally extending channels $a'$ which serve as a bed or supporting surface for the structure hereinafter described. Transverse channels $a^2$ support a table $b$ upon frame $a$, the table $b$ being provided with a hopper $b'$ into which the plastic material $c$ is placed in bulk. Table $b$ is provided with side walls $b^2$ which converge at $b^3$ and are parallel at $b^4$. The bottom of the table $b$, with the parallel portions $b^4$ and hinged top $b^5$ form an orifice $d$ through which the plastic material is forced. The top $b^5$ is hinged at $b^6$ and may thus be lifted to provide ready access to the interior of the table. Locking levers $b^7$ are mounted on bolts $b^8$ which are pivoted to the sides of the table $b$ at $b^9$. These locking levers are spaced in such manner that the top $b^5$ is securely clamped to the table when the machine is operating.

A false top $b^{10}$ is provided at the outer end of the top $b^5$ and formed with an upwardly extending flange $b^{11}$ which engages a correspondingly formed groove $b^{12}$ in the top $b^5$. Bolt $b^{13}$ serves as a seat for spring $b^{14}$ to hold the false top $b^{10}$ against the upper side of the top $b^5$, the false top being so formed as to constitute a continuation of the inner side of the top $b^5$. Adjustable bolt $b^{15}$ is threaded through the top $b^5$ and bears upon the false top $b^{10}$. By screwing the bolt against the false top, the latter may be moved away from the top $b^5$ to diminish the height of the orifice $d$. In this manner, the size and weight of the blocks cut may be varied as desired.

The side portions of the table may be formed of U-shaped channels for reinforcing purposes, in which case, the upper flanges $b^{16}$ are provided with notches $b^{17}$ to receive the bolts $b^8$. A suitable lining $b^{18}$, preferably of wood, is provided on the inner surfaces of the side channels in order to protect the material handled. The top $b^5$ may be formed with reinforcing ribs $b^{19}$ in order to provide additional strength.

Across the orifice $d$, wires $d'$ extend. These wires are spaced at equal intervals and the longitudinal wire $d^2$ serves to divide the orifice into a lower and upper portion. The wires are mounted upon a closed rectangular frame $d^3$ which is mounted upon the table by thumb screws $d^4$. The vertical position of the frame with respect to the table and orifice may, in this manner, be varied to insure the proper spacing of the wires to give equal sized cuts.

From the orifice $d$, the material which has been cut into continuous strips of rectangular cross section, passes over rollers $e$ and between side plates $e'$. The latter are mounted upon the longitudinally extending members $a'$ by brackets $e^2$ and are formed with vertical grooves $e^3$. Mounted upon the longitudinal members $a'$ are transversely extending angle bars $e^4$ which serve as guide tracks for a cutter frame $e^5$. This frame is of generally U-shape construction and is provided with legs $e^6$ which carry pins $e^7$. The angle bars $e^4$ are formed with slots $e^8$ into which the pins $e^7$ extend, thus holding the cutter frame $e^5$ securely upon the bars $e^4$. Between the U-shaped frame members $e^5$ and serving as spacing members, are transverse members $e^9$, between which are mounted cutting wires $e^{10}$. These wires are mounted at equal intervals and serve to cut the continuous strips of material received from the orifice $d$ into equal lengths. A handle $e^{11}$ is provided on the upper transverse member $e^9$ and enables the frame to be drawn transversely across the path of movement of the continuous strips, the cutting wires $e^{10}$ being received in the vertical grooves $e^3$ formed in the side plates $e'$. When a sufficient length of material has passed over the rolls $e$, the cutting frame is moved manually in either direction to cut the strips into desired lengths, the resulting rectangular blocks passing on over the rolls to the delivery table.

A delivery table $f$ receives the blocks which have been cut into proper lengths by the cutting frame $e^5$ and carries the blocks along the table by mechanism which will be described presently. The table is formed with spaced longitudinally extending and stationary strips $f'$, between which movable strips $f^2$ reciprocate. The movable strips are mounted upon a frame or bed $f^3$ at each side of which downwardly extending arms $f^4$ are formed. The frame $f^3$ is provided at both ends with such arms and to these arms are pivoted generally triangular shaped dogs $f^5$. These dogs are formed with surfaces $f^6$ and $f^7$ and corners $f^{10}$ upon certain sides of which the bed $f^3$ rides under certain conditions during its reciprocation. When the dog is riding on the side of corner $f^{10}$ adjacent the face $f^6$, it will be seen that the bed is elevated only to the height shown in Figure 3. However, when the reverse movement of the bed takes place, the side of corner $f^{10}$ adjacent face $f^7$ engages the tracks and the bed is elevated considerably due to the greater altitude of the triangular shaped dog when resting upon the track in this position. During this movement, the movable portions $f^2$ are elevated above the table $f$ and serve to carry the blocks away from the cutting frame $e^5$. Tracks $f^8$ are secured to the longitudinal frame members $a'$ and are formed with notches $f^9$ at either end thereof. The corners $f^{10}$ of the triangular dogs $f^5$ engage these notches and causes the dogs to be tilted with respect to the bed members $f^3$ when movement thereof in the proper direction takes place. In Figure 2, the reciprocating bed is shown just prior to its movement toward the left. Under these conditions, an outwardly extending lug $f^{11}$ on each arm $f^4$ serves as an abutment against which the pivoted dogs engage to prevent further pivotal movement thereof. Movement of the bed $f^3$ causes the dogs to ride along the tracks $f^8$ on the corners $f^{10}$ adjacent the surfaces $f^7$ thus elevating the bed above the table $f$. At the end of the stroke the corners $f^{10}$ engage the appropriate notches $f^9$ in the tracks and, when reverse movement of the bed takes place, the dogs are tripped to cause the beveled surfaces $f^{12}$ to engage the bed $f^3$ and the sides of corner $f^{10}$ adjacent the surfaces $f^6$ ride upon the tracks during this movement. At this time, the elements $f^2$ are below the surface of the delivery table $f$.

The mechanism which carries the material from the hopper to the orifice and forces it along its path of movement, comprises a plunger $g$ provided with a facing $g'$ of wood or the like. The plunger is provided with a scraper element $g^2$ which engages the bottom of the table $b$ and, at either side, compressor wings $g^3$ are pivoted upon the plunger, as at $g^4$. These wings are formed with a facing $g^5$ and co-operate with the facing $g'$ to provide a continuous surface to engage the material. Within the wings, a spring $g^6$ seated on bolt $g^7$ normally urges the wings against the sides of the table $b^2$. In the continued movement of the plunger along the sides, the wings engage the converging portions $b^3$ of the sides and are forced inwardly. This compresses the material within the chamber formed on the table and causes it to be forced through the orifice more effectively. The compressing action of the wings is due to the fact that they are mounted eccentrically with respect to the converging sides $b^3$.

The plunger $g$ is mounted upon longitudinally extending racks $h$ which are carried on a reciprocating frame $h'$. This frame is formed with a cover plate $h^2$ rearwardly of the plunger to prevent the material in the hopper from falling through the reciprocating frame when the plunger is moved to the extreme left-hand side of Figure 6. Brackets $i$, mounted upon the stationary side members of the table are formed with bifurcated extensions $i'$ within which a frame member $j$ lies. Frame member $j$ carries a stop plate $j'$ which prevents the material within the hopper from following the cover plate $h^2$ when the plunger moves toward the right in Figure 6.

In order to reduce the resistance to the movement of the plunger toward the left in Figure 6, a suitable portion of the material in the hopper is cut before it drops into the position to be moved by the plunger. This cutting is performed by a wire $h^3$ which is mounted upon brackets $h^4$ carried by the reciprocating frame $h'$. As indicated in Figure 6 the wire passes over the stop bar $j'$ and through the material in the hopper, thus cutting loose a suitable portion of the material. A middle rail $h^5$ is formed on the reciprocating carriage $h'$ and is provided with shift cams $h^6$ for automatically reversing the direction of movement of the carriage $h'$ when it reaches the end of its stroke.

The driving mechanism and means for reversing the movement of the plunger and carriage will now be described. A bracket $k$ mounted upon the frame $a$ carries an electric motor $k'$ which is coupled to a drive shaft $k^2$. This drive shaft is provided with a worm which drives a worm wheel on shaft $k^3$. Shaft $k^3$ is mounted in the stationary table and is provided with sleeves formed with pinions $k^4$ and $k^{24}$. The sleeves are loosely mounted upon the shaft $k^3$ and provided with clutch teeth $k^5$. A third sleeve $k^6$ is keyed slidably to shaft $k^3$ and provided with clutch teeth $k^7$ which engage cooperating clutch teeth $k^5$ when the sleeve is moved in either direction. In this manner, the pinions $k^4$ and $k^{24}$ may be selectively driven in accordance with the position of sleeve $k^6$.

Countershaft $k^8$ is mounted in the table and carries pinions $k^9$ which engage the racks $h$ of the reciprocating carriage. Gears $k^{10}$ and $k^{11}$ are also mounted upon the countershaft $k^8$, the former engaging pinion $k^4$. This is shown in Figure 13 and represents the condition under which the reciprocating carriage and plunger are moved to the right in Figure 4. Since very little resistance is offered to the movement of the plunger in this direction, the gearing may be such as to afford a fairly rapid movement under these conditions and movement of the sleeve $k^6$ to engage the clutch teeth on this pinion provides such movement of the plunger. A second countershaft $k^{12}$ is mounted in the table and carries reduction gears $k^{13}$ and $k^{14}$, the former engaging the pinion $k^{24}$ and the latter the gear $k^{11}$ on shaft $k^8$. It will be seen that the drive from shaft $k^3$ will be through these gears and result in a correspondingly slow movement of the plunger to the left in Figure 6. This is in accordance with the conditions existing, since movement of the plunger in this direction is resisted by the material which is being forced through the orifice. Upon shaft $k^{12}$ a pinion $k^{15}$ is mounted to engage a gear $k^{16}$. Gear $k^{16}$ is mounted upon a stub shaft $k^{17}$ which carries a crank arm $k^{18}$ pivotally. Crank arm $k^{18}$ is driven from the gear $k^{16}$ through a clutch $k^{19}$, the latter being engaged by spring $k^{20}$. Movement of the crank arm $k^{18}$ is transmitted to the reciprocating bed plate $f^3$ through connecting rod $k^{21}$ and the bed plate is operated through such mechanism, it being quite apparent that the gear $k^{15}$ is driven only when the plunger moves to the left in Figure 6. It is during this movement of the plunger that the material is forced out through the cutters and must be carried away by the delivery table, and the mechanism described above performs such function.

As a controlling means for the transmission described above, a longitudinal rock shaft $l$ is mounted on the frame $a$. Upon this shaft, spaced shifting levers $l'$ are mounted, the latter being formed with cam faces $l^2$ which are engaged by the shifting cams $h^6$ when the carriage $h'$ reaches either end of its stroke. When the cam $h^6$ engages lever $i^2$ and the plunger $g$ has moved to the extreme left hand position, cam $h^6$ engages the cam face $l^2$ on the right-hand lever $l'$ in Figure 6, to shift the sleeve $k^6$ to engage the lower pinion $k^4$ in Figure 4. This reverses the movement of the carriage $h'$ and retracts the plunger. When the latter reaches its extreme right-hand position in Figure 6, the left-hand cam $h^6$ engages the corresponding cam face $l^2$ on the left-hand lever $l'$ to cause the sleeve $k^6$ to be moved in the reverse direction. In this manner, the operation of the plunger is continuous.

The rock shaft $l$ is provided with a manual lever $l^3$ which moves in guide wires $l^4$. These guide wires are mounted upon a bracket $a^3$ carried upon the longitudinal frame members $a$ and are provided with an enlarged portion $l^5$ which represents the neutral position of the clutch sleeve $k^6$. When the lever $l^3$ is moved into this position, the operation of the machine ceases, movement of the lever in either extreme position causing the corresponding movement of the plunger and reciprocating carriage $h'$.

While the invention has been described in connection with the specific structure shown in the accompanying drawings, it is not to be limited, save as defined in the appended claims.

I claim as my invention:

1. A cutting machine comprising a hopper, a plunger for conveying material from the hopper to an orifice, cutting means carried by the machine adjacent the orifice to cut material issuing therefrom, a power source, a transmission driven by the power source, means to move the plunger in either direction to afford a delivery and a return stroke, a cover plate carried by the plunger to support the material in the hopper in the forward stroke of the plunger, a cutting device carried with the plunger for cutting a portion of the material in the hopper to be fed to the orifice by the plunger on the following forward stroke thereof, a stationary stop mounted above the cover plate to prevent the portion so cut from following the cover plate on its reverse movement, and means by which the movement of the plunger is automatically reversed at the end of each stroke.

2. In a cutting machine having a hopper, in which an orifice is formed, cutting means carried by the machine adjacent the orifice, means for conveying material from the hopper to the orifice, a power source to drive the conveying means, means to receive the material as it passes through the orifice, means to cut the material while on the receiving means, and spaced stationary plates, a bed comprising a plurality of movable plates between the respective stationary plates, means operated by the power source for reciprocating the bed, tracks upon which the bed reciprocates, dogs on the bed for riding on the tracks, and means to vary the position of the dogs during certain of the strokes of the bed to vary the elevation thereof.

3. In a cutting machine having a hopper, in which an orifice is formed, cutting means carried by the machine adjacent the orifice, means for conveying material from the hopper to the orifice, a power source to drive the conveying means, means to receive the material through the orifice, means to cut the material while on the receiving means, and spaced stationary plates, a bed comprising a plurality of movable plates between the respective stationary plates, means operated by the power source for reciprocating the bed, tracks upon which the bed reciprocates, dogs on the bed for riding on the tracks, and notches in the tracks at the ends thereof for engaging the dogs.

4. In a cutting machine having a hopper, in which an orifice is formed, cutting means carried by the machine adjacent the orifice, means for conveying material from the hopper to the orifice, a power source to drive the conveying means, means to receive the material as it passes through the orifice, means to cut the material while on the receiving means, and spaced stationary plates, a bed comprising a plurality of movable plates between the respective stationary plates, means operated by the power source for reciprocating the bed, tracks upon which the bed reciprocates, triangular shaped dogs pivoted on the bed for riding on the tracks, the heights on one of the bases of the dogs being greater than those on the other of the bases, and notches in the tracks at the ends thereof for engaging the dogs, certain of the notches engaging certain angles of the dogs to cause the bed to be supported at the lesser height of the dogs, and other of said notches engaging other angles to cause the bed to be supported at a greater height.

This specification signed this 18th day of June, A. D. 1928.

RICHARD F. STEWART.